April 20, 1965

J. E. DICKENS

PROCESS FOR REDUCING NOISE LEVEL IN ELECTROSTATIC RECORDING MEDIA

Filed March 5, 1962

3,179,944

INVENTOR
JOHN E. DICKENS

BY Herbert McWolfson
ATTORNEY 3,179,944

PROCESS FOR REDUCING NOISE LEVEL IN ELECTROSTATIC RECORDING MEDIA

John E. Dickens, Wilmington, Del., assignor to E. I. du Pont de Nemours and Company, Wilmington, Del., a corporation of Delaware Filed Mar. 5, 1962, Ser. No. 177,622
4 Claims. (Cl. 346—1)

The present invention relates to an electrostatic recording process and, more particularly, relates to a method or reducing the noise level in recordings prepared by the electrostatic recording process.

The electrostatic recording process is based on the discovery that as a dielectric recording medium travels between a pair of electrodes, and as the voltage between the electrodes is increased a threshold value of the voltage is reached, above which current flow in the electrode circuit begins to increase rapidly. At voltages above this threshold value, there is a steady current of substantial magnitude which continues so long as the recording medium continues to move past the electrodes. When a signal is recorded on the recording medium by a voltage above the threshold value, it is found that the recording medium receives a charge pattern, corresponding to the signal, which cannot be removed by wiping the surface of the recording medium. Furthermore, the signal can be played back repeatedly by moving the recording medium between electrodes coupled to an amplifier without destroying the recorded signal. In fact, it is found that spraying the surface with ions of polarity to neutralize surface charge on the recording medium actually improves playback of a recorded signal. Threshold voltages of the order of 600 volts for a 0.25 mil polyester tape result in recordings with signal lifetimes of years.

In the recording process, the recording medium in the form of a high resistivity tape, such as polyester tape, is moved between two contacting electrodes by a transport mechanism similar to that used in conventional magnectic recording. A direct current bias voltage of from 600 to 1200 volts plus the signal to be recorded in the form of a signal voltage are impressed between the electrodes and, hence, across the thickness of the tape. In the recording process, the recording tape may be subjected to a pre-bias with one pair of electrodes, and a recording bias polarized oppositely on a second pair of electrodes. It may also be desirable to subject the tape to an ion atmosphere before recording and after recording before reeling the tape. The ion sources positoned adjacent to the moving tape can produce ions in the air by means of a corona discharge from electrodes which are maintained at an A.-C. potential of about 5000 volts (r.m.s.) above ground potential.

The recording tape, after undergoing the described process, with or without the refinements of pre-bias or ion treatments, tends to be noisy. This noise is attributable to two sources. One source is the noise inherent in the tape before the recording process and the other source is noise hesulting from the recording process. It is an object of this invention to substantially reduce the noise from both sources, jointly and singly. Other objects will appear hereinafter.

It has been found that noise resulting from the recording process can be virtually eliminated or at least substantially reduced by careful control of the climatic conditions imposed on the tape prior to and during recording. Hence, for "Mylar"[1] tape, it has been found that the recording noise can be minimized when the recording process is carried out at a relative humidity of about 60% and a temperature of about 75° F. This noise is increased at relative humidities appreciably greater or less than 60%. Thus, a relative humidity of 65% at 75° F. does not completely eliminate recording noise where the tape has previously been stored at a relative humility of 65%. However, where the tape has been stored at a relative humidity of 55%, a relative humidity of 65% during the recording process produces a satisfactory recording with a minimum of recording noise. I have found that an average relative humidity, the average of the relative humidity during storage and of that during the recording process, of about 60%±3%, i.e. 57–63% at normal temperatures (60–85° F.) minimizes recording noise.

The inherent noise of the recording tape is virtually unaffected by climatic conditions. In fact, this noise which is believed to be due to random charges cannot be removed even by exposure to a harsh ion treatment. The present invention, however, serves to remove this noise from the tape substantially completely prior to the recording process or, in the refined recording process, prior to the pre-bias treatment.

The method of accomplishing this result is a two-step process that is performed in a critical sequence. Specifically, it has been found that the inherent noise can be reduced substantially, by a factor of at least 2 and as high as a factor of over 30, by first contacting the recording medium, the tape, with an atmosphere of gaseous ions and then, within 10 hours, preferably within 1 hour and usually immediately after ion treatment, exposing the treated recording medium to an elevated temperature of at least 40° C. but below the softening temperature of the recording medium for a time sufficient to reduce the inherent noise level by a factor of at least 2. At a temperature of 40° C., the time required may be as high as 48 hours. At temperatures of 140° C., the time required to reduce the noise level by a factor of at least 2 may be as low as 2 minutes. Although polyethylene terephthalate film (Mylar) has been used in this work as the recording medium, any relatively strong dielectric material may be used with similar success in this process. Thus, other polyester films, cellulosic films such as cellulose acetate, vinyl polymer films such as polyacrylonitrile and films of polyamides, polyimides, polystyrene, polyethylene, polypropylene may all be used as the recording tape.

The invention will be further clarified by referring to the drawing, in which.

Figures 1, 2, 2A:
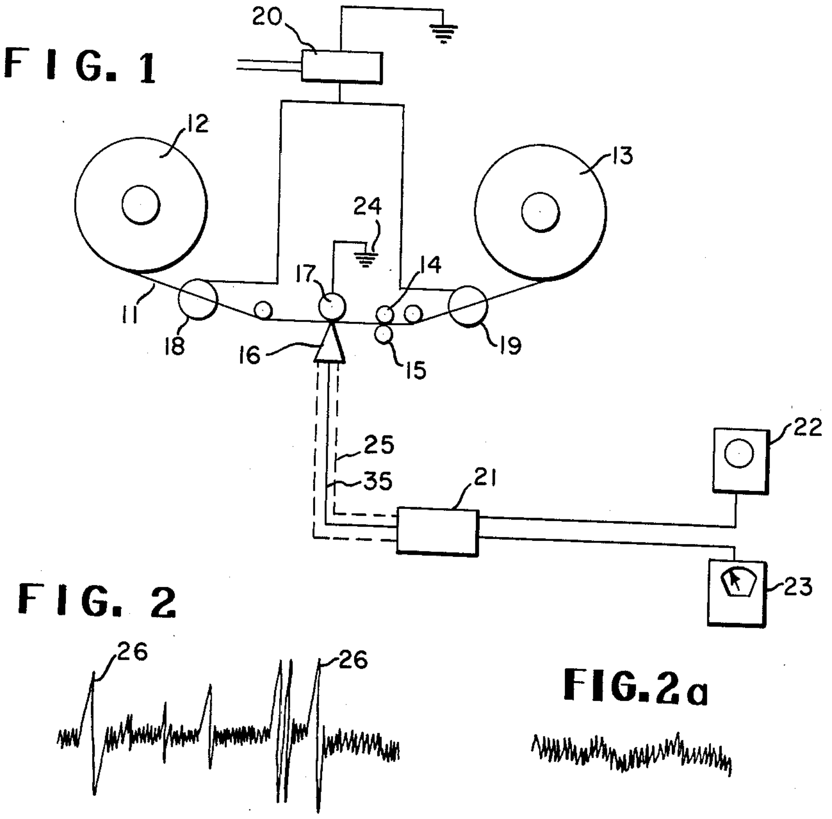
FIGURE 1 is a schematic illustration of an apparatus useful for performing the process of this invention.
FIGURE 2 is a typical noise pattern displayed on the screen of a cathode-ray oscilloscope.
Figure 3:
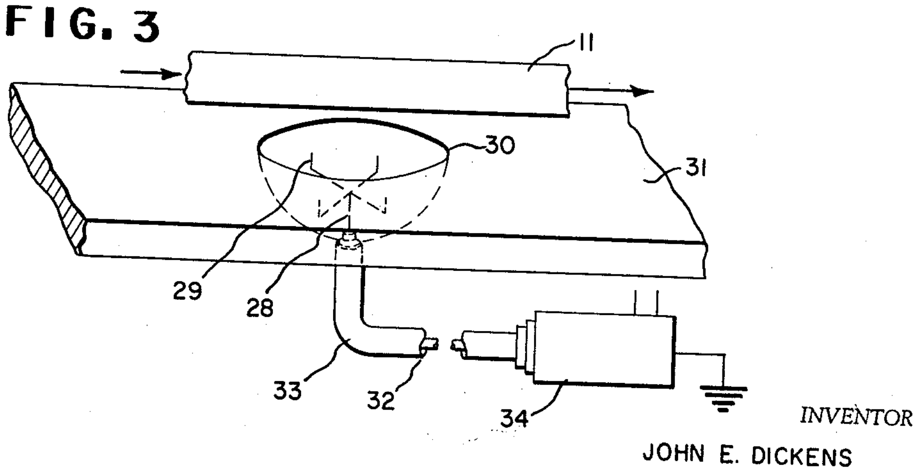

FIGURE 2*a* is the pattern displayed on the screen of a cathode-ray oscilloscope after treatment in accordance with this invention; and FIGURE 3 is a schematic illustration of an ion treatment device.

Referring to the figures, the recording medium 11 in the form of a tape, passes from supply reel 12 to windup reel 13, driven by engagement between capstan 14 and idler 15. Frontal electrode 16 and backing electrode 17 engage the recording medium in its travel. The recording medium travels adjacent to ion sources 18 and 19. These ion sources of the high voltage discharge type, as hereinafter described, are coupled to high voltage transformer 20. Frontal knife edge electrode 16 is coupled to preamplifier 21, such as employed in a Kiethley 102–B electrometer (manufactured by Kiethley Electronics Co., Cleveland, Ohio), which is, in turn, coupled to a cathode-ray oscilloscope 22, or a vacuum-tube voltmeter 23. The amplifier 11 is a cathode-follower type. Backing electrode 17 is grounded at 24. The shield 25 of conductor 35, which conductor couples the frontal electrode 16 to the

[1] Polyester film manufactured by E. I. du Pont de Nemours and Co.

amplifier 21, is driven at cathode potential to minimize the capacity effect of the electrode system and the leads.

In the playback of a recorded sine wave, the usual relationship holds:

$$\frac{\text{Peak-to-peak voltage}}{2\times\sqrt{2}}=\text{root mean square voltage}$$

The peak-to-peak voltage is measured on the cathode-ray oscilloscope and the root mean square voltage is measured on the vacuum-tube voltmeter. With this apparatus (correcting for a 0.85 voltage gain in the preamplifier) recorded signals reach a maximum of about 0.5 volt, peak-to-peak (measured on the scale of a cathode-ray oscilloscope), or 0.177 volt, root mean square (on the vacuum-tube voltmeter). The playback output may comprise the recorded signal, about 0.5 volt peak-to-peak low-level, white background noise (ca. 6 millivolts peak-to-peak) inherent in the recording process, and bursts of noise, which are present in virgin tape, with peaks of ca. 10 mv. r.m.s. FIGURE 2, illustrating a typical noise pattern from playback, shows tall spikes 26 representing the random bursts of tape noise and the broadened trace 27 representing the white background noise.

In the practice of this invention, the tape passes through the ion atmosphere at 18 or 19 and then may be heated directly or wound up on a reel and placed in an oven. In the practice of this invention, the operation of only one of the ion sources 18 and 19 is required. Preferred ion sources, which operate by corona discharge in air caused by a high voltage alternating current are shown schematically in FIGURE 3. Discharge electrode 28 is mounted in a manner that fine discharge points 29 are in an opening 30 of the apparatus deck 31, with points 29 just below the surface. These points are coupled by conductor 32 through insulated lead 33 to a high voltage transformer 34 of the type usually employed with neon signs. After passage of the tape through the ion atmosphere, the reeled tape is heated in an air oven for various lengths of time, with noise measurements taken with the tape at room temperature after various heating periods. Tape quieting may be effected by the combination of ion treatment followed by heating the tape at temperatures as low as 40° C. At this temperature after ion treatment, all major bursts of noise are removed by heating for 48 hours.

While the corona discharge method of producing gaseous ions has been found quite convenient, the use of heated filaments such as a platinum wire heated to about 1,000° C. or the use of ultraviolet light may also function in this capacity. The extent of exposure to the ions is not very critical. Passage of the tape through the ion atmosphere obtained from a corona ion source (the source having a cross section of 1 inch) at a speed of 7.5 inches per second is quite effective. However, speeds up to about 50 inches per second may also be used with conventional ion generators, i.e. 5,000 volts r.m.s. or thereabouts. Voltages of 2,000–30,000 volts may be used to provide the electrostatic field gradient of at least 30,000 volts per centimeter for ionizing air. With the higher voltages, the speed of the tape may be increased to 100 inches per second or higher. In any case, the permissible speed of the tape will depend on the voltage of the ion generator, the distance of the electrode from the tape, etc., and can be easily determined by simple experiment.

The invention will be even more clearly understood by referring to the following examples of specific embodiments.

EXAMPLE 1

Sample tapes of "Mylar" [1] polyester film, type 100C, are passed through an ionized air atmosphere using 5,000 volts r.m.s. on the ion generator at 7½" per second as shown in FIGURE 1, rewound on a metal roll, and heated in air ovens for various times with the results shown in Table I.

[1] Du Pont trademark.

*Table I*

| Heat treatment: | Pulse noise (millivolts, r.m.s.) |
|---|---|
| Virgin | 6.0 |
| 5 minutes/140° C. | 1.5 |
| 10 minutes/140° C. | 1.0 |
| 5 minutes/120° C. | 3.0 |
| 10 minutes/120° C. | 0.8 |
| 15 minutes/120° C. | 0.6 |
| 10 minutes/100° C. | 1.8 |
| 30 minutes/100° C. | 0.9 |
| 60 minutes/100° C. | 0.7 |
| 110 minutes/100° C. | 0.5 |
| 60 hours/80° C. | 0.4 |

EXAMPLE 2

Sample tapes of "Mylar" [1] polyester film, type 50A, are treated as in Example 1 with the results given in Table II.

*Table II*

| Heat treatment: | Pulse noise (millivolts, r.m.s.) |
|---|---|
| Virgin | 10.0 |
| 5 minutes/120° C. | 2.2 |
| 10 minutes/120° C. | 0.8 |
| 15 minutes/120° C. | 0.4 |
| 20 minutes/120° C. | 0.3 |
| 10 minutes/100° C. | 3.5 |
| 20 minutes/100° C. | 2.5 |
| 60 minutes/100° C. | 1.5 |
| 50 minutes/80° C. | 2.6 |
| 90 minutes/80° C. | 2.6 |
| 60 hours/80° C. | 1.2 |

EXAMPLE 3

Sample tapes of "Mylar" [1] polyester film, type 50C, are treated as in Example 1 with the results given in Table III.

*Table III*

| Heat treatment: | Pulse noise (millivolts, r.m.s.) |
|---|---|
| Virgin | 4.0 |
| 15 minutes/120° C. | 0.3 |
| 60 hours/80° C. | 0.3 |

EXAMPLE 4

Sample tapes of "Mylar" [1] polyester film, type 25C, are treated as in Example 1 with the results given in Table IV.

*Table IV*

| Heat treatment | Pulse noise (millivolts, R.M.S.) |
|---|---|
| Virgin | 12 |
| 5 min./100° C. | 4.0 |
| 10 min./100° C. | 1.0 |
| 15 min./100° C. | 0.4 |
| 20 min./100° C. | 0.4 |
| 60 hours/80° C. | 0.4 |

EXAMPLE 5

Sample tapes of "Mylar" [1] polyester film, types 25C, 35C, 50A and 50C are heated at 60° C. for various periods from 1 hour to 20 hours. The pulse noise is reduced by a factor of at least two in all samples after heating for 20 hours. No mechanical distortion of the tape or tracking difficulty was apparent.

EXAMPLE 6

Samples, as in Example 5, are heated at 40° C. The pulse noise is reduced to a level below the machine noise (approx. 1 mv.) after 48 hours heating. No mechanical distortion of tape or tracking difficulty is experienced.

Although only audio recording has been described, the process of this invention is applicable to electrostatic re-

[1] Du Pont trademark.

cording, in general, and would apply to video and other analog recording, etc.

Having fully disclosed the invention, what is claimed is:

1. In the process of electrostatic recording wherein the dielectric medium is placed between a pair of electrodes and is subjected to a voltage across the electrodes, said voltage being above the threshold voltage for current flow to said dielectric medium and also being directly related to a signal voltage whereby a charge is impressed in said dielectric medium corresponding to the signal, the improvement for reducing the noise level in the dielectric medium wherein the dielectric medium is contacted first with an atmosphere of gaseous ions and, thereafter, is heated to an elevated temperature, both steps being carried out prior to recording.

2. In the process of electrostatic recording wherein the dielectric medium is placed between a pair of electrodes and is subjected to a voltage across the electrodes, said voltage being above the threshold voltage for current flow to said dielectric medium and also being directly related to a signal voltage whereby a charge is impressed in said dielectric medium corresponding to the signal, the improvement for reducing the noise level in the dielectric medium wherein the dielectric medium is contacted first with an atmosphere of gaseous ions and, thereafter, is heated to an elevated temperature, both steps being carried out prior to recording and, during recording said dielectric medium is maintained at a temperature of 60–85° F. and a relative humidity of 57–63%.

3. A process as in claim 1 wherein said atmosphere of gaseous ions is produced by impressing a voltage between 2,000–30,000 volts across said dielectric medium in air sufficient to provide an electrostatic field gradient of at least 30,000 volts per centimeter.

4. A process as in claim 1 wherein said dielectric medium is heated to a temperature between 40° C. and the softening temperature of the dielectric medium.

References Cited in the file of this patent

UNITED STATES PATENTS

| | | |
|---|---|---|
| 1,981,780 | Rutherford | Dec. 20, 1932 |
| 2,692,948 | Lion | Oct. 26, 1954 |
| 3,038,073 | Johnson | June 5, 1962 |